United States Patent [19]
Arlon et al.

[11] Patent Number: 5,452,185
[45] Date of Patent: Sep. 19, 1995

[54] MOTOR VEHICLE HEADLAMP HAVING IMPROVED ORIENTATION INDICATING MEANS

[75] Inventors: Philippe Arlon, Ozoir la Ferriere; Guy Dehaene, Bagnolet, both of France

[73] Assignee: Valeo Vision, Bobigny Cedex, France

[21] Appl. No.: 203,800

[22] Filed: Mar. 1, 1994

[30] Foreign Application Priority Data

Mar. 4, 1993 [FR] France ............... 93 02507

[51] Int. Cl.⁶ .................................................. B60Q 1/06
[52] U.S. Cl. ......................... 362/66; 362/282; 362/287; 362/427
[58] Field of Search ................ 362/66, 80, 61, 427, 362/428, 282, 284, 287, 289

[56] References Cited

U.S. PATENT DOCUMENTS

| | | | |
|---|---|---|---|
| 5,055,980 | 10/1991 | Mochizuki | 362/66 |
| 5,063,480 | 11/1991 | McMahan et al. | |
| 5,065,293 | 11/1991 | Mochizuki | |
| 5,068,769 | 11/1991 | Umeda et al. | |
| 5,077,642 | 12/1991 | Lisak | 362/66 |
| 5,138,542 | 8/1992 | Daumueller et al. | 362/66 |
| 5,150,958 | 9/1992 | Miyazawa et al. | 362/428 |
| 5,197,794 | 3/1993 | Scott et al. | 362/66 |
| 5,197,799 | 3/1993 | Dehaene | 362/66 |
| 5,228,768 | 7/1993 | Suzuki | 362/66 |

*Primary Examiner*—Ira S. Lazarus
*Assistant Examiner*—Sara Sachie Raab
*Attorney, Agent, or Firm*—Morgan & Finnegan

[57] ABSTRACT

A motor vehicle headlamp comprises a housing which encloses a lamp, a mirror cooperating with the lamp so as to define a light beam, and a cover glass, together with adjustable mounting means to enable the orientation of the beam to be varied, these mounting means comprising an adjusting member which is displaceable in translation with respect to a fixed part of the vehicle, together with an orientation indicating means. The orientation indicating means comprise a graduated element carrying a scale, together with an indicating element having a pointer, these two elements being adjacent to each other and both mounted on the outside of the housing; and means for carrying one of these two elements in such a way that it is displaceable in translation with the adjusting member, with a further means carrying the other one of the said elements on the fixed part of the vehicle. One of these carrier means is adjustable in the direction in which the adjusting member is displaceable.

17 Claims, 4 Drawing Sheets

MOTOR VEHICLE HEADLAMP HAVING IMPROVED ORIENTATION INDICATING MEANS

FIELD OF THE INVENTION

The present invention relates in general terms to orientation indicating means for motor vehicle headlamps, or to mirrors of such headlamps.

BACKGROUND OF THE INVENTION

It is conventional to equip a headlamp with means for adjusting its beam in the horizontal direction and/or the vertical direction (i.e. in azimuth and/or in elevation, respectively). It is also conventional to preset in the factory a "zero" position or reference orientation. Fine adjustment can be carried out subsequently, either manually or with the aid of a motor, within a predetermined range of angles with respect to the reference orientation.

It is known in the prior art to employ various means which are attached in the workshop to abutments or the like which are provided on the vehicle, so as to indicate the deflection or orientation error with respect to the reference orientation, according to the position of the headlamp housing or that of the reflector which is enclosed within the housing. In this connection, reference is invited to French published patent specification FR 2 658 293A. This arrangement does however have the disadvantage that it requires the use of special orientation indicating means. These are separate from the vehicle and may therefore be mislaid, or unavailable, and so on. They may indeed become wrongly positioned on the vehicle, and this gives rise to errors in the indication of beam orientation.

Another known arrangement consists in providing, on the headlamp, means for permanently retaining a "memory" of the reference orientation as set in the factory during assembly, arranged in such a way as to indicate both the reference orientation and also the deflection or error with respect to the reference orientation.

An adjusting and indicating knob, which enables this requirement to be satisfied, is also known from French published patent specification FR 2 664 963A. Such a knob does however have quite a complex and inconvenient construction.

Finally, it is also known to provide orientation indicating means which are mounted on the reflector, and which lie at least partially within the housing of the headlamp, which makes it necessary to provide in the housing a transparent observation window, and which makes reading somewhat difficult.

DISCUSSION OF THE INVENTION

An object of the present invention is to overcome the above mentioned drawbacks of the prior art, and to propose a headlamp which is equipped with orientation indicating means which are at the same time simple, inexpensive, easy to adjust and easy to read.

According to the present invention, a motor vehicle headlamp, of the type comprising a housing enclosing a lamp, a mirror cooperating with the lamp so as to define a beam, a cover glass, and means for adjustably mounting at least one movable portion of the headlamp on a fixed part of the vehicle with a view to enabling the orientation of the beam to be varied, the said means comprising at least one adjusting member which is movable in translation with respect to the said fixed part, together with an orientation indicating means, is characterised in that the said indicating means comprises:

an element mounted on the outside of the headlamp housing and carrying a scale extending along one edge, which itself extends essentially parallel to the direction of displacement of the adjusting member, an element which is again mounted on the outside of the housing and which carries a pointer adjacent to the said scale, and means for mounting one of the said elements in such a way that it is displaceable in translation with the said adjusting member, together with means for mounting the other element on the said fixed part, one of the said mounting means being adjustable in the direction of displacement of the said adjusting member.

In one embodiment, the element carrying the scale (referred to in this specification also as the "graduated element") is mounted adjustably on the said fixed part, with the associated mounting means comprising a screw which is engaged in an oblong hole extending essentially parallel to the direction of displacement of the adjusting member.

The adjusting member is preferably in the form of a threaded rod which is adapted to be moved in translation by rotation on itself, while the element carrying the pointer (also referred to herein as the "indicating element") may itself then consist of an element in the form of a disc which is mounted coaxially on the said threaded rod, the pointer being defined by the peripheral edge of the disc.

In a modified embodiment, one of the said graduated and indicating elements is mounted on the said rod in such a way as to be displaceable in translation with the latter, and includes means for mounting the said element on the said rod while allowing relative rotation to take place between these two components, together with means cooperating with a further component, in the form of a fixed element which is engaged on the rod, in such a way as to prevent rotation of the said element during rotation of the rod.

The threaded rod is for example engaged in a smooth bore formed in that one of the said graduated and indicating elements which is mounted on the rod, and means are provided which are engaged on the rod so as to prevent any sliding movement of the said element with respect to the said rod.

The other one of the two elements (indicating element or graduated element) may in that case have a generally U-shaped cross section, and may be engaged on a free edge of the said fixed part which extends essentially parallel to the direction of displacement of the adjusting member, with the associated one of the said mounting means comprising a serrated surface which enables the position of the said other element to be varied. This serrated surface may be defined by a set of teeth in the base of a groove formed in the said fixed part adjacent to the said free edge, with the free end of a lug of the said other element cooperating with these teeth.

Finally it is very much preferred that the graduated and indicating elements should initially be joined together by rupturable means such as small lugs or bridges, in a position such that the pointer lies in line with a zero mark on the scale.

Further aspects, features and advantages of the present invention will appear more clearly on a reading of the detailed description of preferred embodiments of the invention which follows, and which is given by way of example only and with reference to the accompanying drawings.

DESCRIPTION OF PREFERRED EMBODIMENTS OF THE INVENTION

Figure 1:
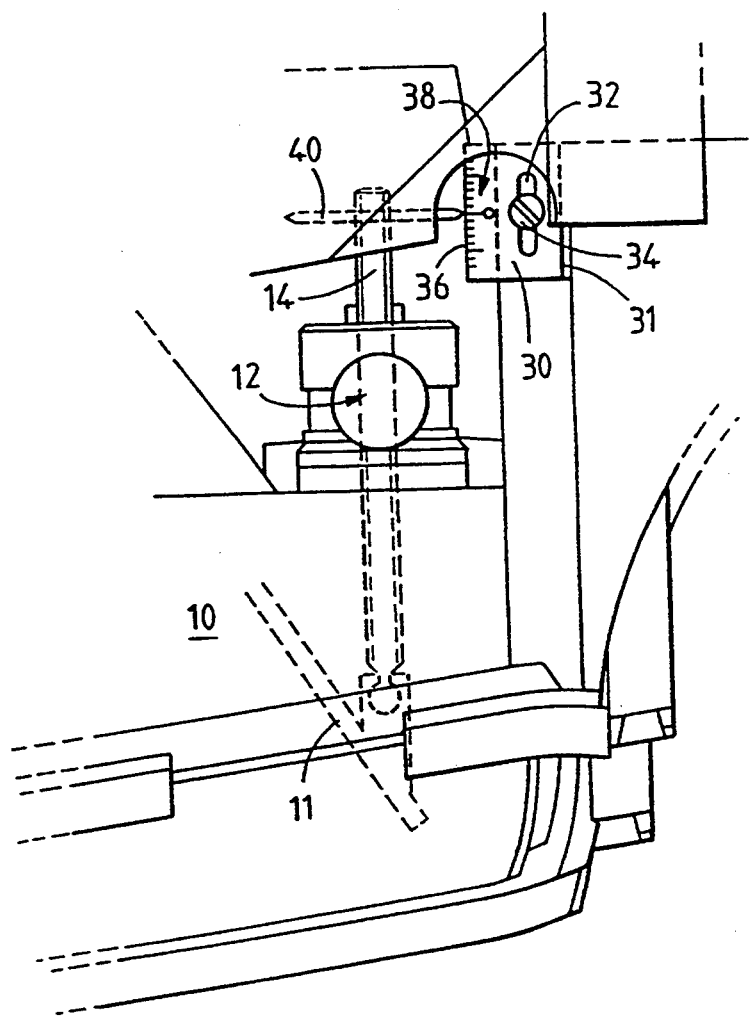
FIG. 1 is a top plan view showing part of a headlamp which is equipped with an adjustable beam orientation indicator in a first embodiment of the present invention.

It should first be noted that, as between the various features of the drawings, those elements or parts which are identical or similar to each other are indicated as far as possible by the same reference numerals.

Figure 2:
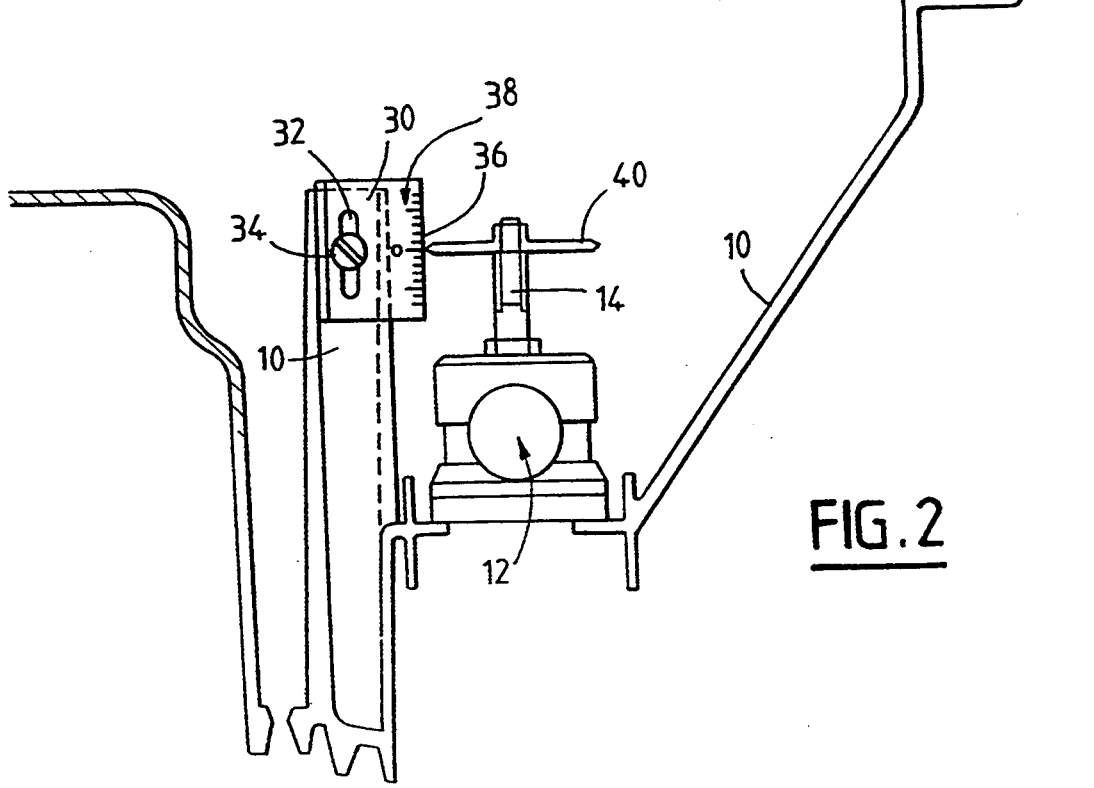
FIG. 2 is a bottom plan view showing part of the same headlamp as in FIG. 1.
Figure 3:
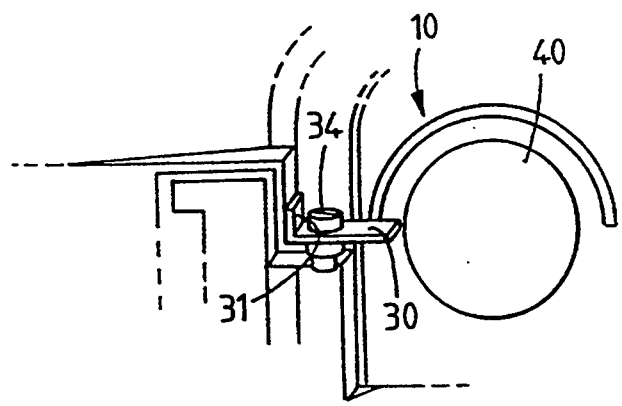
FIG. 3 is a perspective view showing part of the same headlamp as in FIGS. 1 and 2.

Reference is first made to FIGS. 1 to 3, which show diagrammatically part of the posterior region of a headlamp housing 10. The headlamp has a mirror or reflector 11, the orientation of which is adjustable (in this particular case in azimuth). The mirror 11 is located inside the housing 10. It is adjustable by means of a threaded adjusting rod 14 which is mounted on the housing 10 by means of a fixed mounting element 12. The latter may typically include an adjusting knob. The adjusting rod 14 is connected to the mirror 11 at one end (its lower end in FIG. 1), and projects out of the housing 10 at the rear of the latter, in the region of the other end of the adjusting rod. If the latter is rotated, this causes it to move in translation with respect to the housing 10, in a direction which is horizontal and essentially parallel to the optical axis (which is oriented vertically in the view seen in FIGS. 1 and 2).

Means for indicating a reference azimuth orientation, and a deviation or error in the real orientation of the headlamp with respect to this reference orientation, are provided. These indicating means comprise firstly a graduated element 30 and secondly, means 40 defining an indicator, the graduated element 30 and the indicating means 40 being both arranged outside the housing 10.

In this example, the graduated element 30 comprises a rigid plate having an oblong transverse aperture or slot 32, with a vertical positioning edge 31 being arranged on the plate parallel to the aperture 32. Along a straight edge 36 of the plate 30, opposite to the positioning edge 31, the plate 30 has a graduated scale 38, a central graduation of which is a zero mark. The plate 30 can be fixed in an adjustable way on any appropriate arrangement of the housing (for example a horizontal lug), by means of a screw 34 which is engaged in the aperture 32 and screwed into an appropriate threaded socket.

The indicating element 40 in this example comprises a component in the form of a disc, which is mounted on the threaded rod 14 that projects from the rear of the housing, so as to be displaceable with the rod 14 along its axis.

During assembly of the headlamp in the factory, it is conventional to use photometric means for measuring and/or analysing the light which is emitted by the headlamp, so as to set the azimuth reference orientation of the mirror by adjustment of the rod 14. Once the reference position has been set, the graduated element 30 is then adjusted. This adjustment is effected by virtue of the oblong slot 32, in such a way that its zero mark will lie in line with the peripheral edge of the indicating or pointer disc 40. Subsequently, when the adjusting rod 14 is operated, either by hand or by means of an electric motor, the scale 38, together with the pointer disc 40, give an indication to the operator of the discrepancy between the orientation of the beam in azimuth as compared with its reference orientation.

In addition, a further adjustment of the reference orientation may if necessary be carried out in the workshop. Thus, in the event that play, or dimensional variations, have caused the position of the housing with respect to the body of the vehicle to change, or have caused the position of the mirror to change with respect to the headlamp housing, the screw 34 can be loosened, and the graduated element 30 can then be displaced along its slot 32, thus enabling the readjustment of the zero mark to be carried out in a very simple way.

Such indicator means are extremely simple and inexpensive, and are easy to read. This reading is further facilitated if the indicating means are arranged in the upper region of the headlamp.

Figure 4:
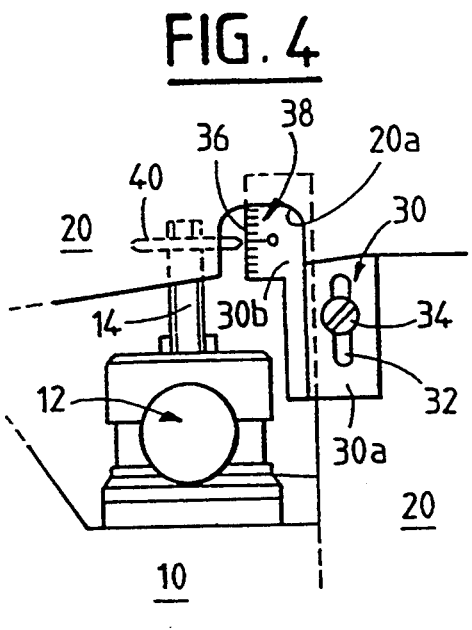
FIG. 4 is a top plan view, drawn diagrammatically and showing part of a headlamp having an adjustable beam orientation indicator in a second embodiment of the invention.

Reference will now be made to FIG. 4, which shows an indicating means which differs from that in FIGS. 1 to 3 mainly in regard to its shape and the disposition of the graduated member 30. It will be seen in FIG. 4 that the member 30 is in two parts 30a and 30b, which are offset from each other. The portion 30a has the oblong slot 32 by which the member 30 is secured on the housing 10. The portion 30b is extended towards the rear (i.e. upwardly in FIG. 4) with respect to the portion 30a, and carries the scale 38 along its straight side 36, parallel to the oblong slot 32 and parallel to the threaded adjusting rod 14. The periphery of the pointer disc 40 lies close to the edge 36.

It will also be noted that an essentially semicircular notch 20a is formed in an adjacent element 20 of the body of the vehicle, to enable the scale 38 to be read, and the pointer 40 to be seen, from above.

Figure 5:
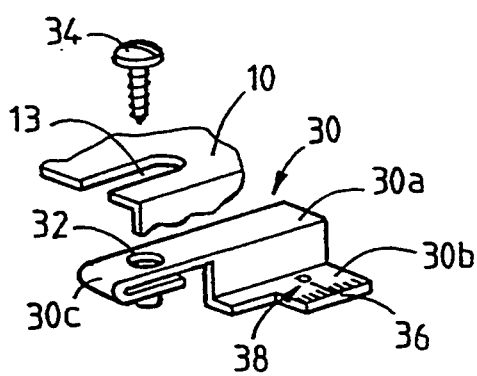
FIG. 5 is a perspective view showing a modified version of the indicator with which the headlamp of FIG. 4 is equipped.

FIG. 5 shows a modified version of the graduated member of FIG. 4. In FIG. 5 it will be noted that the two portions 30a and 30b are offset vertically, i.e. they lie at different heights (as is also true in FIG. 4). The portion 30a includes an extension 30c, which is bent back on itself downwardly, with its two overlapping regions having two through holes, indicated collectively at 32. The lower one of these two holes 32 is dimensioned to conform with the thread of the screw 34, which is of the self-tapping kind.

In association with the element 30, a portion of the housing 10 has in the region of one free edge an elongated notch 13 which is open on this edge, the width of this notch being larger than the thread diameter of the screw and smaller than the width of the extension 30c of the element 30. The region adjacent to the notch 13 is arranged to be trapped between the two branches of the bent back portion 30c of the element 30, and to be gripped when the screw 34 is tightened. The oblong shape of the notch 13 enables the position of the element 30 to be adjusted in a direction parallel to the scale 38, as in the case of the Figures previously described.

Figure 6:
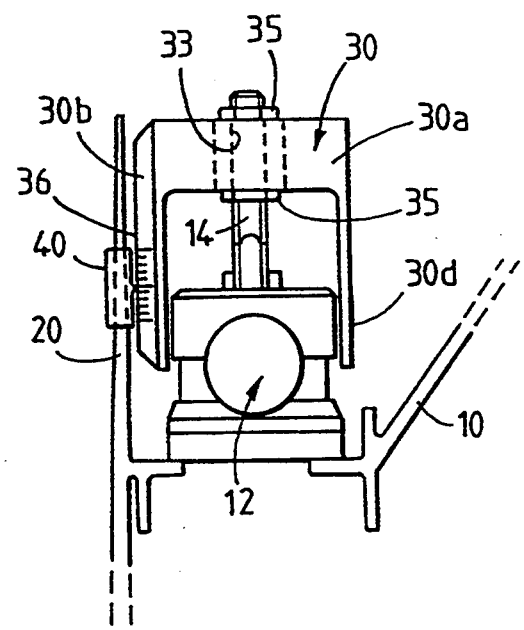
FIG. 6 is a top plan view, drawn diagrammatically and showing part of a headlamp which is equipped with an adjustable beam orientation indicator in a third embodiment of the invention.
Figure 7:
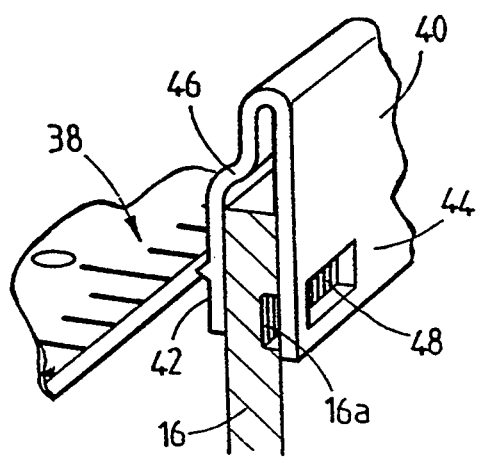
FIG. 7 is a perspective detail view, in cross section, showing the same indicator as in FIG. 6 but on a larger scale.
Figure 8:
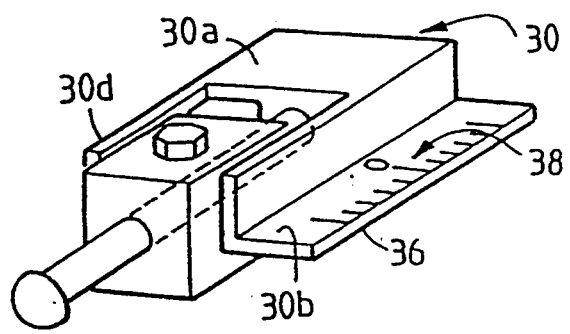
FIG. 8 is a perspective view of part of a beam orientation indicator in a modified version of that shown in FIGS. 6 and 7.

Reference is now made to FIGS. 6 to 8, which show a third embodiment of the invention. This embodiment differs from the two embodiments so far described, in that it is the graduated element 30 which moves with the adjusting bar 14, while the pointer element 40 is mounted adjustably on the housing. The element 30 is in the form of a body 30a which is formed with a smooth bore 33 through which the adjusting bar 14 extends, the latter being immobilised on the element 30 by two elements 35, of the type known as Circlips (Trade Mark) or the like. Two branches 30b and 30d extend forward from the body 30a. These branches 30b and 30d closely flank the element 12, the cross section of which is non-circular, so as to prevent any rotation of the element 30 when the bar 14 is rotated in order to move it in translation. The branch 30b has an essentially horizontal flat wing portion extending along a free lateral edge 36 on which the scale 38 is marked.

The indicating element 40, which is shown in detail in FIG. 7, is in the form of a member having a cross section in the form of a cranked U, with two branches 44 and 46 which trap between them the region of a free upper edge of a membrane 16. This membrane is fixed to the body of the vehicle and extends parallel to the direction in which the adjusting rod 14 and element 30 are displaced. A horizontal groove 16a, having a serrated base, is formed on one side face of the membrane 16. A lug 48, cooperating with the serrated base of the groove 16a, is provided in the branch 44 of the element 40. The lug 48 penetrates resiliently into the groove 16a, so as to cooperate with its serrated base and thus to define a plurality of stable positions for the element 40. The element 40 also has a triangular bead 42, acting as a pointer, on the face of the element 40 which faces towards the scale 38 on the element 30.

Zero adjustment, that is to say matching the pointer 42 with the zero mark on the scale, is carried out in this embodiment by displacing the element 40 on the membrane 16.

Figure 9:
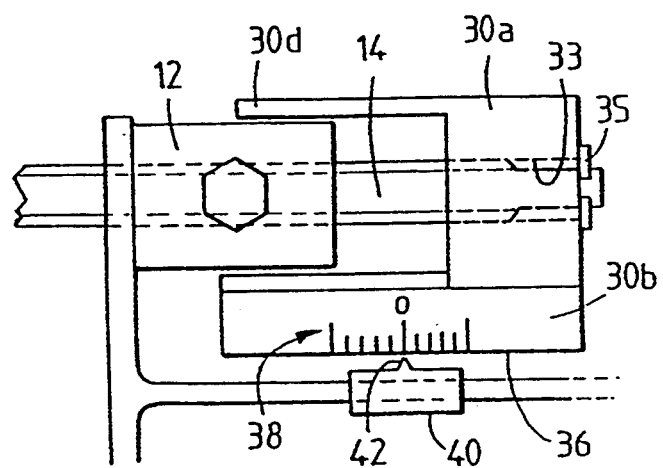
FIG. 9 is a top plan view of the indicator seen in FIG. 8.

FIGS. 8 and 9, to which reference is now made, show a slight modification of the embodiment of FIGS. 6 and 7, in which the body 30a of the graduated element 30 is immobilised on the adjusting bar 14, firstly by a stop element 35 which may be a Circlip (Trade Mark) or the like, and secondly by providing complementary steps in the rod 14 and the smooth bore 33.

Figure 10:
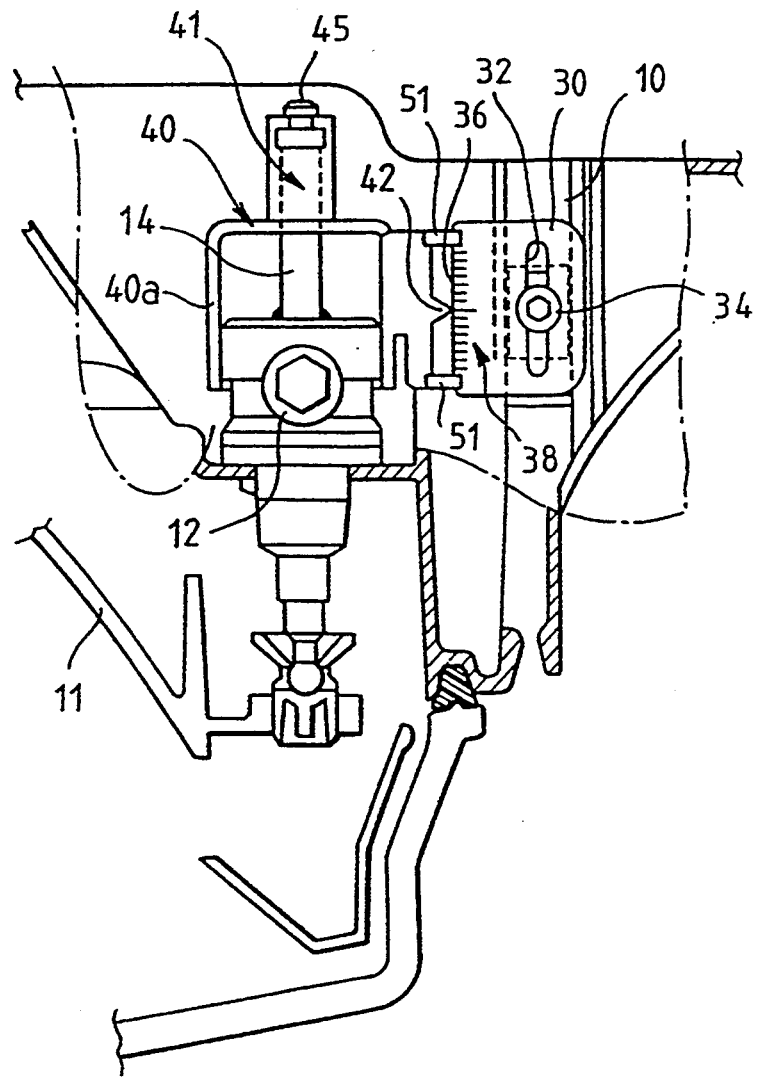
FIG. 10 is a top plan view, drawn diagrammatically and shown partly in cross section, of a headlamp which is equipped with an adjustable beam orientation indicator in a fourth embodiment of the invention.
Figure 11:
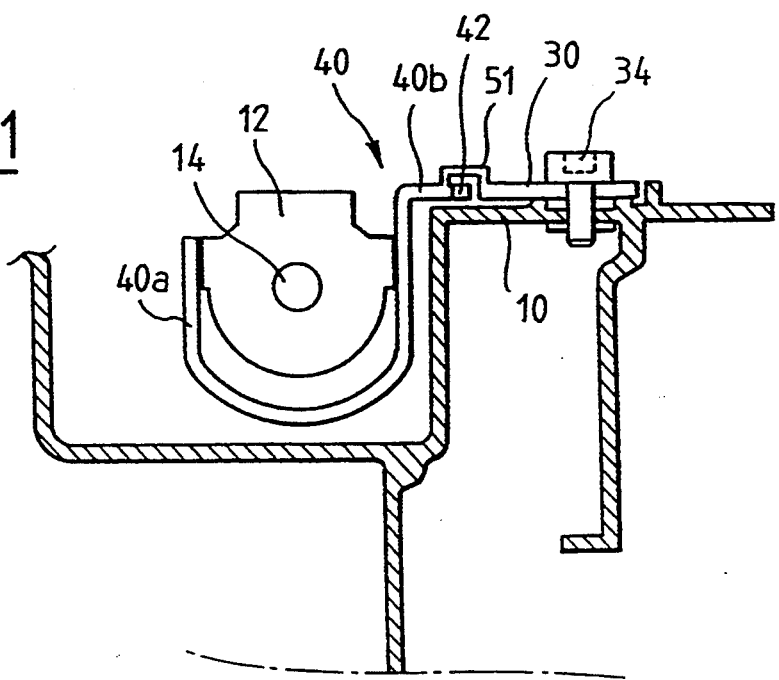
FIG. 11 is a front elevation, shown partly in cross section, of part of the same headlamp as is seen in FIG. 10.

A fourth embodiment of the invention will now be described with reference to FIGS. 10 and 11. In this version, the graduated element 30 is again fixed to the body of the vehicle, while the indicating element 40 is displaceable with the adjusting rod 14. The graduated element is similar to that in the embodiment shown in FIGS. 1 to 3, with a scale 38 which extends along a free edge 36 of the element, together with an oblong slot 32.

The indicating element 40 is received on the adjusting rod 14. For this purpose, it comprises a body portion or cage 40a, having a rearward extension in which a smooth bore 41 is formed, with the rod 14 extending through this bore 41. A terminal circlip 45, fitted on the adjusting rod 14, secures the latter to the element 40 for longitudinal movement together. Rotation of the element 40 is prevented by virtue of the matching shapes of the interior of the cage 40a and the element 12 (i.e. the vertical lateral faces as can be seen in FIG. 11).

A wing portion 40b extends laterally from the cage 40a, and a pointer 42 is provided on a terminal edge of the wing portion 40b. The pointer 42 is displaceable along the scale 38 of the element 30 as the adjusting rod 14 is moved longitudinally.

One particularly advantageous feature of this particular embodiment arises from the fact that, during the factory fitting of the headlamp on the vehicle, the elements 30 and 40 constitute a single component, in that they are joined together by means of two rupturable nibs or bridges 51, which connect the respective ends of the mutually facing edges of the graduated portion 30 and of the portion 40b which carries the pointer 42. The position of the elements 30 and 40, joined together in this way, is then such that the pointer 42 lies exactly in line with the zero mark on the scale 38.

The component comprising the elements 30 and 40 is prefitted on to the adjusting rod 14 of the headlamp, through the element 40. Afterwards, the screw 34 having been loosened or withdrawn in advance, the headlamp is adjusted on its reference orientation by means of an appropriate measuring instrument, by actuation of the adjusting rod 14. During this adjustment, the plate 30 will assume a certain position on the housing, in which a threaded hole for the screw 34 is circumscribed by the oblong slot 32 in the element 30. The securing screw 34 is then tightened so as to immobilise the element 30.

Once these operations have been carried out, the bridging elements 51 are cut so as to separate the elements 30 and 40 from each other. Thus, when any subsequent adjustments are made to the azimuth setting of the beam, the elements 30 and 40, being respectively in fixed relationship with the adjusting member 14 and the housing 10, are able to be displaced with respect to each other so as to indicate the real orientation of the beam, with respect to the reference orientation indicated by the zero mark on the scale 38.

The feature just described has the advantage of simplifying factory fitting, with no action to align the pointer with the zero mark on the scale being necessary. In addition, the number of separate components used in the assembly is reduced.

The present invention is of course not limited to the embodiments described above and shown in the drawings, but may be modified or varied in accordance with the spirit of the invention in any way that may occur to the person skilled in this particular technical field.

In particular, the invention may be used equally well for the indication of orientation in azimuth or orientation in elevation. In addition, although the application of the invention to headlamps having a housing has been described above, the invention is equally well applicable to headlamps of the kind not having a housing as such, but in which the mirror itself constitutes the housing, with the orientation of the whole of the headlamp being caused to vary with respect to the body of the vehicle. In that case, one of the elements 30 and 40 is mounted on an element adjacent to the body of the vehicle.

Finally, in all the embodiments described herein, the element which carries a scale, and the element carrying a pointer associated with the scale, are of course always interchangeable.

What is claimed is:

1. A headlamp for a motor vehicle defining a fixed part of the vehicle, the headlamp having at least one moveable part; a housing having an outside thereof and a wall; a lamp in the housing; a mirror; means mounting the mirror for cooperation with the lamp to define therewith a light beam; and adjustment mounting means mounting the at least one movable part of the headlamp on the fixed part of the vehicle whereby to cause an orientation of the light beam to vary, wherein the adjustable mounting means has at least one adjusting member movable in translation with respect to the fixed part of the vehicle, and orientation indicating means operatively connected to the adjusting member, the indicating means comprising:

a graduated element having an edge extending substantially parallel to a direction of a movement of the adjusting member, and having a graduate scale along said edge, and means mounting said graduated element adjustably relative to the outside of the housing;

an indicating element having a pointer adjacent to said scale and movable relative thereto, and means mounting said indicating element outside of the housing;

first carrier means mounted on one of said graduated and indicating elements for translational displacement of said one of said graduated and indicating elements with the adjustment member, and second carrier means for mounting an other one of said graduated and indicating elements on the fixed part, one of said carrier means being adjustable in the direction of displacement of the adjusting member;

said second carrier means having an oblong hole extending substantially parallel to the direction of displacement of the adjusting member, and a screw engaged in said hole, the adjusting member having a threaded rod, said threaded rod extending through the wall of the housing for rotation and for the translation and said indicating element further having disc-shaped element mounted coaxially on said threaded rod and a peripheral edge formed on said disc-shaped element to provide said pointer; and wherein one of said graduated and indicating element is mounted on said threaded rod whereby said rod is displaceable in translation with said indicating element, means for mounting said indicating element on said threaded rod while allowing relative rotation therebetween, said indicating element further including a fixed element engaged on said threaded rod for engaging one of said graduated and indicating elements on the rod to prevent rotation of one of said graduating and indicating elements and while the rod is being rotated.

2. A headlamp according to claim 1, wherein one of said graduated and indicating elements that is mounted on said threaded rod further comprises a smooth bore, said threaded rod being engaged in said bore, said indicating means further including means engaged on said threaded rod to prevent sliding movement of said element with respect to said threaded rod.

3. A headlamp according to claim 1, wherein the other one of said graduated and indicating elements further comprises a generally U-shaped cross section, the fixed part of the vehicle defining a free edge extending substantially parallel to the direction of the displacement of the adjusting member, said other element being engaged on said free edge of the fixed part, said second carrier means having serrated means for enabling the position of said other element to be varied.

4. A headlamp according to claim 3, wherein the fixed part further comprises a groove adjacent to said free edge and having a base formed with teeth defining a first part of said serrated means, said other element having a lug defining a free end thereof cooperating with the said teeth to form the remainder of said serrated means.

5. A headlamp, for a motor vehicle defining a fixed part of the vehicle, the headlamp having at least one movable part and comprising: a housing having an outside thereof and a wall; a lamp in the housing; a mirror; means mounting the mirror for cooperation with the lamp to define therewith a light beam; and adjustable mounting means mounting the at least one movable part of the headlamp on the fixed part of the vehicle whereby to cause an orientation of the light beam to vary, wherein the adjustable mounting means has at least one adjusting member movable in translation with respect to the fixed part of the vehicle, and orientation indicating means operatively connected to the adjusting member, the indicating means comprising:

a graduated element having an edge extending substantially parallel to a direction of a movement of the adjusting member, and having a scale along said edge, and means mounting said graduated element adjustably relative to the outside of the housing;

an indicating element having a pointer adjacent to said scale, and means mounting said indicating element outside of the housing;

first carrier means mounting one of said graduated and indicating elements for translational displacement of said one of said graduated and indicating elements with the adjusting member, and second carrier means mounting an other one of said graduated and indicating elements on the fixed part, one of said carrier means being adjustable in the direction of displacement of the adjusting member;

and wherein the adjusting member has a threaded rod, the housing wall having said threaded rod extending therethrough for movement in translation, one of said graduated and indicating elements being mounted on said threaded rod whereby to be displaceable in translation with said threaded rod, and means for mounting said displaceable element on said threaded rod while allowing relative rotation therebetween, said indicating element further including a fixed element engaged on said rod cooperating with said means mounting one of the said graduated and indicating elements on said rod, whereby to prevent rotation of one of said graduating and indicating elements mounted thereby while said rod is being rotated.

6. A headlamp according to claim 1, further comprises said second carrier means for mounting said graduated element on the fixed part, and defines an oblong hole extending substantially parallel to the direction of displacement of the adjusting member, and a screw engaged in said oblong hole.

7. A headlamp according to claim 6, wherein said indicating element comprises a disc-shaped element mounted coaxially on said rod, said disc-shaped element having a peripheral edge defining the said pointer.

8. A headlamp according to claim 5, wherein that one of said graduated and indicating elements that is mounted on said threaded rod is formed with a smooth bore, said threaded rod being engaged in said bore, said indicating element further including means engaged on said threaded rod to prevent sliding movement of said indicating element with respect to said threaded rod.

9. A headlamp according to claim 5, wherein the other one of said graduated and indicating elements that is mounted on the fixed part further comprises a generally U-shaped cross section, the fixed part of the vehicle defining a free edge extending substantially parallel to the direction of displacement of the adjusting member, said other element being engaged on said free edge of the fixed portion, said second carrier means having toothed means for enabling the position of said other element to be varied.

10. A headlamp according to claim 9, wherein the fixed part further comprises a groove adjacent to said free edge and having a base formed with teeth defining a first part of a serrated means, said other element having a lug defining a free end thereof cooperating with said teeth to form the remainder of said serrated means.

11. A headlamp, for a motor vehicle defining a fixed part of the vehicle, the headlamp having at least one movable part, a housing having an outside and a wall thereof; a lamp in the housing; a mirror; means mounting the mirror for cooperation with the lamp to define therewith a light beam; and adjustable mounting means mounting the at least one movable part of the headlamp on the fixed part of the vehicle whereby to cause an orientation of the light beam to vary, wherein the adjustable mounting means has at least one adjusting member movable in translation with respect to the fixed part of the vehicle, and orientation indicating means operatively connected to the adjusting member, the indicating means comprising:

a graduated element having an edge extending substantially parallel to a direction of a movement the adjusting member, and having a scale along said edge, and means mounting said graduated element adjustably relative to the outside of the housing;

an indicating element having a pointer adjacent to said scale, and means mounting said indicating element outside of the housing;

first carrier means mounting one of said graduated and indicating elements for translational displacement of said one of said graduated and indicating elements with the adjusting member, and second carrier means mounting the other one of said elements on the fixed part, one of said carrier means being adjustable in the direction of displacement of the adjusting member; and wherein said graduated element and indicating element together define rupturable means for joining these two elements together, said scale having a zero mark and said indicating element pointer being aligned with said zero mark.

12. A headlamp according to claim 11, wherein further comprising said second carrier means mounting said graduated element on the fixed part, and forming an oblong hole extending substantially parallel to the direction of displacement of the adjusting member, and a screw engaged in said oblong hole.

13. A headlamp according to claim 12, wherein the adjusting member further comprises a threaded rod, said threaded rod extending through the housing wall for movement in translation, and said indicating element having a disc-shaped element mounted coaxially on said rod and having a peripheral edge defining said pointer.

14. A headlamp according to claim 11, wherein the adjusting member comprises a threaded rod, said threaded rod extending through the housing wall for movement in translation, and wherein one of said graduated and indicating elements is mounted on said threaded rod to be displaceable in translation with said threaded rod, and means for mounting said element on said threaded rod while allowing relative rotation therebetween, said indicating element further including a fixed element engaged on said threaded rod cooperating with said means mounting one of said graduated and indicating elements on said rod, whereby to prevent rotation of one said graduating and indicating elements mounted thereby while said rod is being rotated.

15. A headlamp according to claim 14, further comprising one of said graduated and indicating elements that is mounted on said threaded rod is formed with a smooth bore, said threaded rod being engaged in said bore, said indicating means further including means engaged on said threaded rod to prevent sliding movement of said element that is mounted on said threaded rod with respect to said threaded rod.

16. A headlamp according to claim 14, wherein the other one of said graduated and indicating elements that is mounted outside of the housing has a generally U-shaped cross section, the fixed part of the vehicle defining a free edge extending substantially parallel to the direction of displacement of the adjusting member, said other element that is mounted on the fixed part being engaged on said free edge of the fixed part, said second carrier means having serrated means for enabling the position of said other element that is mounted outside of the housing to be varied.

17. A headlamp according to claim 16, wherein the fixed part further comprises a groove adjacent to said free edge and having a base formed with teeth defining a first part of said serrated means, said other element that is mounted on the fixed part having a lug defining a free end thereof cooperating with said teeth to form the remainder of said serrated means.

* * * * *